Patented Mar. 12, 1929.

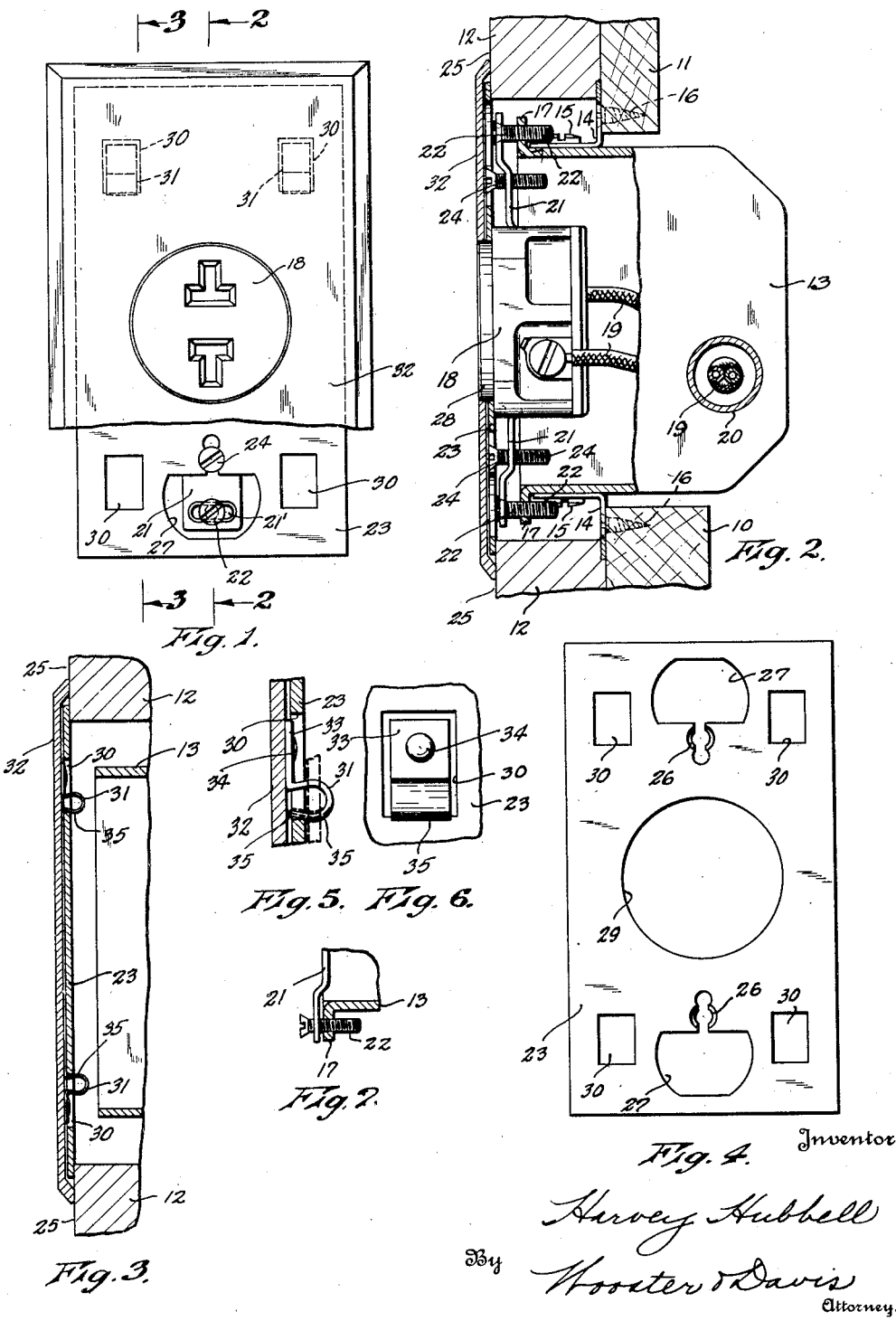

1,705,014

UNITED STATES PATENT OFFICE.

HARVEY HUBBELL, OF BRIDGEPORT, CONNECTICUT; LOUIE E. HUBBELL EXECUTRIX OF HARVEY HUBBELL, DECEASED.

MOUNTING FOR SWITCHES AND RECEPTACLES.

Application filed April 5, 1926. Serial No. 99,782.

This invention relates to an electric wall appliance and particularly to an improved means for mounting the appliance in the outlet box and has for an object to provide means whereby the electrical device, such as a flush switch or flush receptacle may be loosely mounted in the outlet box when that box has been installed back of the plaster line and then may be drawn out to the plaster line by the screws provided in the mounting plate, with means arranged to coact with the first mentioned means to easily and quickly adjust the device to the proper position relative to the surface of the wall and then rigidly and securely mount it in this position.

It is also an object of the invention to combine with this installation an improved means for attaching the cover or finishing plate.

With the foregoing and other objects in view, I have devised the construction illustrated in the accompanying drawing forming a part of this specification, similar reference characters being employed throughout the various figures to indicate corresponding elements. In this drawing, Fig. 1 is a front elevation of an installation involving my invention, a portion of the cover plate being broken away to more clearly show a portion of the supporting plate.

Fig. 2 is a vertical section through the installation substantially on line 2—2 of Fig. 1 but showing the electrical device in elevation.

Fig. 3 is a detail section through the cover and supporting plates substantially on line 3—3 of Fig. 1.

Fig. 4 is a plan view of the supporting plate.

Fig. 5 is a detail section through a portion of the cover and supporting plate showing in elevation one of the spring clips for mounting the cover plate and also showing the operation thereof.

Fig. 6 is a plan view of this clip looking from the right of Fig. 5, and

Fig. 7 is a detail section of the loose mounting between the electrical device and the wall outlet box.

Referring to Fig. 2, 10 and 11 represent part of the wood work of the wall and 12 represents the finishing portion of the wall including the plastering, lathing and so forth. Mounted in the wall recess in any suitable manner is a wall outlet box 13 which is of the usual metal construction and is mounted in position, in the present instance, by means of brackets 14 secured to the ends of the box by screws 15 and to the wooden elements 10 and 11 by the screws 16. The portions of these brackets secured to the walls of the box are usually provided with slots for the screws 15 so that there is certain adjustment available for the box to position it the proper distance from the face of the wall. The box is provided with the usual ears 17 for mounting the electrical device.

In the drawing, I have shown a receptacle 18 adapted for use with the usual attachment plug cap, but it will, of course, be understood that this mounting is equally adapted for use with any of the usual types of wall switches. The electrical device is connected to the house wiring system by the usual leads 19 passing into the box from the conduit 20.

The electrical device includes and is supported by a yoke 21 which projects from the upper and lower sides of the device and has openings or slots 21' adjacent its outer ends for passage of the screws 22 threaded into the ears 17 of the wall box. In mounting the electrical device in the box these screws are not clamped tight, or that is, are not screwed up to clamp the yoke 21 against the ears 17 but are left out a certain distance, as indicated in Figs. 2 and 7, so that the electrical device is loosely mounted in the box and may have limited movements in or out, that is, in the direction normal to the plane of the wall. The inward movement, of course, will be limited by the yoke engaging the edge or the ears 17 of the box and the outward movement will be limited by the yoke engaging the heads of the screws 18, the yoke being guided in this movement by the screws. The screws are adjusted so that when the device is pulled outwardly to the limit of its outward movement as determined by the heads of these screws the device will be in the proper position relative to the face of the wall. The electrical device is secured and held in this position by means of a supporting plate 23 and screws 24. This plate is of a size to rest against the outer surface 25 of the wall and has countersunk openings 26 for the screws 24 which are threaded into the yoke 21. The plate is also provided with openings 27 to give access to the screws 22 to allow for adjustment of these screws and thus adjust the position of the electrical device within the outlet box. After the electrical device has been loosely mounted in the outlet box as above described the plate 23 is placed against the surface of the wall, and, in the case of the receptacle shown, with the extension 28 extending into the opening 29 in the plate. The screws 24 are then tightened up to draw the yoke and the electrical device outwardly the limit of the movement permitted by the screws 22, as shown in Fig. 2. It will be apparent that in this position the screws 24 in the supporting plate draw the yoke 21 tightly against the under side of the heads of the screws 22 and thus securely fasten the whole device in the position desired. It will also be apparent that by adjusting the screws 22 and 24 the electrical device may be easily and quickly adjusted to the proper position with respect to the surface of the wall and then clamped in that position.

The supporting plate 23 is also provided with a plurality of openings 30 which are preferably rectangular as shown. These openings are arranged in pairs, in the present instance, two pairs being shown, and they coact with spring clips 31 mounted on the rear side of the cover or finishing plate 32 to detachably mount the same in position over the supporting plate and the opening in the wall to give the desired finished appearance. The spring clips 31 in the form shown in the drawing are of flat sheet metal having a foot 33 secured to the cover plate by suitable means, as a rivet 34. The clip is bent laterally to substantially U-shape, as shown in Fig. 5, with the open side toward the plate, and the sides of this U-portion are also preferably bowed outwardly to give a stronger holding effect with the plate. The clips are arranged in pairs to correspond with the openings 30 in the supporting plate and the clips of each pair are arranged in reversed relation so that, for instance the left hand pair as shown in Fig. 3, are arranged with the free portion 35 of each clip extending toward the other clip. They are so arranged that when the cover plate is placed over the supporting plate with the inner ends of the clips in the openings 30, a pressure against the outer surface of this plate to force it toward the surface of the wall will cause the bow in the free portions 35 of the clips to ride over the edge of the opening 30 and force this free end in a short distance against the resiliency of the clip, as indicated in dotted lines, Fig. 5. The spring action of the clip coacting with the curved surface of this bowed portion of the clip will then react against the edge of the opening 30 to securely clamp the cover plate against the wall surface. The plate may be removed by inserting a thin tool under the edge of the plate and prying it outwardly. It will be apparent that this means of mounting the plate is not visible on the outer surface of the plate so that there is nothing to mar the appearance of the surface and the plate may be mounted without requiring the use of any tools.

It will be apparent from the foregoing description that this mounting is very simple in construction, that the electrical device may be loosely mounted in the outlet box and connected to the wiring system and left in this condition until the man to perform the finishing operations places the supporting plate in position, and then the electrical device may be adjusted to the proper position and securely clamped in this position by manipulation of the screws 22 and 24, which is a very simple operation and easily performed. After the wall surface has been completed the cover plate may be easily and quickly applied without requiring the use of any tools whatever.

Having thus set forth the nature of my invention, what I claim is:

1. A wall mounting for an electrical device of the character described comprising an outlet box mounted in the wall, an electrical device in said outlet box, adjustable means for loosely securing the device to said box arranged to allow movement of the device in a direction normal to the wall, a supporting plate engaging the wall, securing screws passing through the plate and connected to the electrical device to draw it outwardly to the limit of movement allowed by the securing means, and a cover plate enclosing the supporting plate.

2. A wall mounting for an electrical device of the character described comprising a support mounted in the wall, an electrical device, adjustable means for loosely securing the device to the support to allow limited movement of the device in a plane transverse the plane of the wall, a supporting plate engaging the wall, securing means connecting the plate to the device and arranged to draw the device to the limit of the movement allowed by the securing means, and a cover plate enclosing the supporting plate.

3. In a device of the character described, a support, means for mounting the support in a wall, an electrical device, and adjustable means for mounting the device on said support to allow a limited movement outwardly in a direction away from the support, a supporting plate adapted to engage the wall, securing screws passing through the plate and having threaded engagement with the device to draw it outwardly to the limit allowed by the securing means, and a cover plate secured over the supporting plate.

4. In a device of the character described, a wall outlet box, means for mounting the box in a wall recess, an electrical device in said box provided with a yoke, screws passing through the yoke and threaded in said box to loosely secure the device in the box and allow a limited outward movement of the device, a supporting plate engaging the wall, screws passing through the plate and threaded into the yoke to draw it forwardly to the limit allowed by the first screws and coact therewith to rigidly secure the device in position, and a cover plate enclosing the supporting plate.

5. In a device of the character described, a wall outlet box, means for mounting the box in a wall recess, an electrical device including a supporting yoke, screws passing through the yoke and threaded in the box, a supporting plate over the entrance to said recess and engaging the wall, said plate having openings in alignment with said screws to allow access thereto for adjusting the screws, screws passing through the plate and threaded into the yoke, and a cover plate enclosing the supporting plate.

6. In a device of the character described, a wall outlet box, means for mounting the box in a wall recess, an electrical device including a supporting yoke, a supporting plate engaging the wall, adjustable securing means extending between the yoke and the box, and adjustable securing means extending between the plate and the yoke, said plate being apertured opposite the securing means so that each of said securing means is accessible for manipulation from the front of the plate.

7. In a device of the character described, a wall outlet box, means for mounting the box in a wall recess, an electrical device, a supporting plate, means for adjustably securing the device to the box to allow inward and outward movements of the device, and means for adjustably securing the device to said plate to allow movement of the device in a direction normal to the plane of the plate, said plate being apertured opposite the securing means so that each of said adjusting means is accessible for manipulation from the front of the plate.

In testimony whereof I affix my signature.

HARVEY HUBBELL.